3,533,813
LOW DENSITY CLAY CERAMIC
COMPOSITIONS
Gerald L. Geltman, Wayne, N.J., assignor to Allied Chemical Corporation, New York, N.Y., a corporation of New York
No Drawing. Filed Nov. 29, 1967, Ser. No. 686,745
Int. Cl. C04b 33/04
U.S. Cl. 106—41                              8 Claims

ABSTRACT OF THE DISCLOSURE

This specification discloses formable clay molding compositions containing finely divided organic fillers precoated with a soluble alkali metal silicate, the corresponding lightweight ceramics obtained by firing these compositions at temperatures from 800° C. to 1200° C. and a process for preparing them. The ceramics obtained have low densities and surprisingly high strengths and are useful in convention nonstructural ceramic applications.

---

Lightweight ceramic articles which have good strengths, and comparatively low densities are in great demand for nonstructural applications such as wall tile, interior and exterior facings, curtain walls and the like. Lightweight materials can be installed more easily than heavy materials with consequent savings in labor and installment costs. Lightweight ceramics are also desirable as insulation materials due to their stability and noncombustibility at elevated temperatures.

Many suggestions have been made in the prior art to develop low density ceramic units, but difficulties of manufacture, high cost or low strength of the resultant materials have prevented their adoption in commercial quantities.

The incorporation into a clay mixture of various finely divided organic fillers which burn off during firing of the clay to leave voids in the fired ceramic is well known. However, since the voids normally reduce the amount of material able to withstand an applied stress, the strengths of the resultant porous ceramics are proportionally reduced. The use of finely divided organic fillers has other disadvantages in that they are difficult to incorporate uniformly into clay compositions. Further, organic materials such as woodflour and sawdust vary in character and behavior from batch to batch depending on their origin, average particle size and the like. An additional disadvantage is that increasing amounts of such fillers in a clay composition increases the amount of water needed to form the filled clay mixture into shaped articles, with consequent problems of drying and/or shrinkage of the resultant fired articles.

It is a principal object of the present invention to provide lightweight ceramic articles having good strengths.

It is another object to provide filled clay compositions containing finely divided organic fillers which burn off at the temperatures of firing to give low density fired ceramic articles having good strength.

It is a further object to provide a process for preparing lightweight ceramic articles having good strength.

Further objects will become apparent from the following details description thereof.

It has been discovered that lightweight, strong ceramic articles can be prepared by precoating combustible, finely divided organic particles with a soluble alkali metal silicate or borosilicate, admixing the precoated particles with a formable clay composition, forming the mixture into the desired shape and firing the article. The articles obtained using precoated organic fillers have unexpectedly high strengths, much higher than are obtained from similarly filled and fired compositions made without precoating the combustible organic filler according to the processes known in the prior art.

The clay mixture employed hereinafter sometimes referred to as formable clay can comprise a single clay or a mixture of various clays together with a flux if needed and sufficient water so that the mixture can be formed or cast. Suitable common clays consist principally of hydrosilicates of alumina and include kaolinite, montmorillonite, illite, ball clays, fire clays, flint clays, shale, slip clays, terra cotta and bentonite. The exact composition of a clay will vary according to its place of origin. The fluxes most generally used include nepheline syenite, feldspar, dolomite, magnesite and talc. In addition to clay, flux and water, various inorganic fillers known in the art can be added to the clay to obtain particular properties or decorative effects. Such fillers include perlite, vermiculite, expanded clay aggregate, clay spherulites, asbestos, glass wool and hollow glass microspheres such as those disclosed in U.S. Pats. 2,978,339, 2,973,340 and 3,030,215. These hollow glass microspheres have a diameter in the range of 5–5000 microns and wall thickness of from 0.5 to 10% of their diameters. The preparation of low density, high strength ceramic articles containing hollow glass microspheres is more fully disclosed in a copending application of the present inventor, U.S. Ser. No. 638,600, filed May 15, 1967. The above described inorganic fillers or mixtures of them can be present in amounts from about 5 to about 55 percent by weight, preferably in amounts of from about 10 to about 40% by weight of the clay composition.

Any finely divided organic material that will burn off at the temperatures of firing of the clay composition can be employed as the precoated organic filler in the present invention. Suitable fillers include, for example, woodflour, sawdust, coal dust, safflower hulls, rice hulls, peanut shells, ground corn cobs and the like.

The soluble alkali metal silicates useful for coating the finely divided organic filler include sodium silicate, potassium silicate, lithium silicate and the like, as well as borosilicates such as sodium borosilicate. The silicates can be employed in any convenient form either powdered or granular, hydrated or dehydrated, or as an aqueous solution.

The organic fillers are precoated by admixing the soluble silicate and the organic filler in the desired proportions, which can range from a silicate to filler weight ratio of from about 0.10:1 to about 5.5:1. Sufficient water is added to insure thorough wetting of the filler. The resultant slurry is poured into a suitable container, and dried to remove water. The water can be removed by air drying or by heating in an oven at temperatures of from about 100° C. up to about 250° C. The dried mass is pulverized in any convenient manner, as in a burr mill, hammer mill, ball mill, etc. Soft particles are formed at silicate to filler ratios of about 0.10:1 whereas when the silicate to filler ratio is over about 5:1, very hard particles are formed. The precoated filler is finely divided by standard grinding or milling techniques to a particle size of about 300 microns or less, preferably to about 250 microns or less.

The finely divided particles of dry, percoated organic filler are then added to the clay mixture. At least about 5% by weight of the precoated filler should be added in order to obtain any significant change in properties of the fired ceramic articles and amounts of up to about 70% by weight of precoated filler can be added. Clays containing more than about 70% by weight of precoated filler may be difficult to fire into useable, easily handled articles.

The clay to silicate weight ratio must be higher than about 2.5:1 to prevent excessive melting, densification and shrinkage of the article during firing. Silicates, particularly sodium silicate, have been widely used in the ceramic art in very small amounts, up to about 0.5% by weight of the clay, to reduce the viscosity of clay suspensions in water before casting. In larger concentrations silicates have been used as a flux to reduce the firing temperature required to mature the ceramic, but carful control is required to prevent flocculation which results in an unpourable clay mixture. According to the present process, large quantities of silicates can be added to the clay as a coating on organic fillers without the disadvantages known heretofore. The maximum clay to silicate weight ratio that can be employed will vary depending on the firing temperature, as is known to one skilled in this art. Preferably in the process of the present invention the clay to silicate weight ratio is from about 2.5:1 to about 25:1.

Sufficient water or water and water glass is added to the mixture of clay and precoated organic filler to form the mixture into the desired shape. The final concentration of water can vary from about 4 to 15% by weight of the mixture. The amount of water present is important and must be carefully controlled in order to obtain fired ceramic articles having uniform strength and shrinkage characteristics.

The mixture containing clay, precoated organic filler and water can be formed in any convenient manner, either by casting into a suitable mold or pressing in a conventional hydraulic press with a steel or aluminum die at pressures which can vary from about 25 to about 2000 p.s.i. The pressed units are then removed from the die. The formed units are dried to remove water either by air drying or by heating in a drying oven at temperatures up to about 250° C.

The formed, dry articles are then fired at higher temperatures ranging from about 800° C. to about 1200° C. until the article has achieved its maximum strength. The preferred firing temperature and time of firing for common clay mixtures is dependent upon the composition of the clay and can be readily ascertained for the particular clay mixture employed as will be known to one skilled in the art.

Precoating the organic fillers according to the present invention, in addition to greatly increasing the strength obtainable in the fired ceramic article, has the advantage that fully developed high strengths can be obtained at lower temperatures of firing than are obtainable using the same fillers without precoating them. At the same time the difficulties heretofore encountered in forming clay mixtures containing substantial amounts of silicates, i.e., the need for adding additional water and then having to remove additional water, scumming on the surface of drying ware, difficulties of uniformly dispersing the silicate in the clay and the like, are eliminated. The presence of even small amounts of precoated filler, e.g., about 5 to 10% by weight of the clay, reduces the temperature required to obtain high strengths in the fired ceramic and at the same time reduces the density of the fired ceramic.

In addition to inorganic and precoated organic fillers, various colorants, glazes, sealants, engobes and the like suitable for the particular clay body chosen, can be employed as will be known to one skilled in the art. For example, a suitable glaze can be applied to the formed clay article in the green condition or in the bisque condition and fired to mature the glaze.

The lightweight ceramic articles of the invention can thus be prepared in a variety of ways to obtain various densities, strength, decorative effects and the like, desired as sheet, tiles, bricks, etc. They can be utilized for conventional ceramic applications and are particularly suitable for interior and exterior facings, curtain walls, partitions, decorative fascias and the like.

The invention will be illustrated further by the following examples although it is to be understood that the invention is not to be limited to the details described therein.

In the examples, all parts and percentages are by weight. The bulk density, water absorption and apparent density tests were carried out in accordance with ASTM test C-373-56. The flexural strength was determined according to the ASTM test C-328 using span lengths of 1″ and 2″ and a head speed of 0.005″/min. Compressive strength was determined in accordance with ASTM test C-407-58 at a loading rate of 200 p.s.i./min. and a head speed of 0.2″/min. Shrinkage measurements were made on standard 2″ samples.

EXAMPLE 1

A precoated woodflour consisting of 65% of woodflour and 35% of sodium silicate (silicate to woodflour ratio of 0.55:1) was prepared by mixing together 260 grams of woodflour having a particle size of 250 microns or less, 280 ml. of 40° Bé. sodium silicate solution and 1000 ml. of water and drying at 110° C. for about 16 hours. The product was crushed so that the particles would pass through a 100 mesh screen (150 microns or less).

A mixture containing 34% of the precoated woodflour as prepared above, 66% of a clay mixture containing 69% of Bell Ball Clay, 30% of nepheline syenite and 1% of bentonite, and 10 parts of water for each 100 parts of solid were blended, pressed in a steel die at 100 p.s.i., dried in air and fired at 1050° C. for one hour.

The resultant article had the following properties:

Bulk density—92.3 lbs./cu. ft.
Flexural strength—1800 p.s.i.
Compressive strength—4200 p.s.i.
Porosity—39%.
Absorption—25%.
Total linear shrinkage—19%.

EXAMPLE 2

A series of ceramic articles were prepared to compare the strengths of articles, prepare and fired as in Example 1, filled with the precoated woodflour of the invention and articles filled with uncoated woodflour and also containing various amounts of sodium silicate.

The results are tabulated below:

PRECOATED WOODFLOUR

| Clay: Sodium Silicate, weight ratio: | Woodflour, percent | Flexural strength, p.s.i. |
|---|---|---|
| 21 | 11 | 1,300 |
| 14.5 | 14 | 1,100 |
| 8.2 | 21 | 750 |
| 3.5 | 36 | 300 |

UNCOATED WOODFLOUR

| | | |
|---|---|---|
| 11.8 | 14 | 600 |
| 8.5 | 18 | 200 |
| 5.1 | 26 | 100 |

It is apparent that the ceramic articles filled with the precoated woodflour have surprisingly high strengths when compared to those containing similar quantities of sodium silicate and uncoated woodflour and fired at the same temperatures.

EXAMPLE 3

A fired ceramic article was prepared as in Example 1 but using 15 parts of the precoated woodflour for 85 parts of the clay mixture described in Example 1.

The fired article had a bulk density of 94.0 lbs./cu. ft. and a flexural strength of 1190 p.s.i.

EXAMPLE 4

A precoated woodflour was prepared according to the procedure given in Example 1 using 150 grams of woodflour, 125 ml. of 40° Bé. sodium silicate solution and 875 ml. of water.

Several fired articles were prepared following the procedure given in Example 1 using various amounts of the precoated woodflour given above and the clay mixture described in Example 1. The results are tabulated below:

| Precoated Woodflour, percent: | Bulk density, lbs./cu.ft. | Flexural strength, p.s.i. |
|---|---|---|
| 15 | 89 | 1,300 |
| 20 | 84 | 1,125 |
| 30 | 78 | 795 |
| 50 | 58 | 270 |

EXAMPLE 5

A series of fired ceramic articles were prepared following the procedure given in Example 1 and varying the amounts of woodflour to clay, and the amounts of woodflour to sodium silicate. These runs are summarized below:

| Precoated woodflour, percent | Silicate-woodflour ratio by weight | Firing temp., °C. | Bulk density, lbs./cu. ft. | Flexural strength, p.s.i. | Linear shrinkage, percent |
|---|---|---|---|---|---|
| 15 | 0.5 | 1,000 | 104.0 | 1,210 | 8.0 |
| 29 | 0.45 | 1,050 | 91.0 | 2,080 | 19.0 |
| 14.5 | 1.9 | 1,000 | 102.0 | 1,650 | 5.0 |
| 23.5 | 0.57 | 1,000 | 87.0 | 800 | 5.5 |
| 49.5 | 0.12 | 1,000 | 38.2 | 30 | 16.0 |
| 40.5 | 5.1 | 1,000 | 78.9 | 890 | 2.5 |
| 54.5 | 0.55 | 1,000 | 55.0 | 220 | 6.0 |
| 68.5 | 0.31 | 1,000 | 38.0 | 133 | 11.5 |

EXAMPLE 6

This example illustrates the effect of varying the amount of water used to assist in compressing the samples during forming. 15 parts of precoated woodflour having a silicate to woodflour ratio by weight of 0.5:1 was used with 85 parts of the clay body described in Example 1. The samples were fired at 1050° C. for one hour. The results are tabulated below:

| Parts water/100 parts solids: | Bulk density, lbs./cu. ft. | Flexural strength, p.s.i. | Linear shrinkage, percent |
|---|---|---|---|
| 5 | 96 | 1,850 | 12.1 |
| 10 | 95 | 1,175 | 10.5 |
| 15 | 102 | 1,200 | 11.3 |

It is apparent that careful control of the water used in preparing the ceramics is required for control of the strength achieved in the fired article.

EXAMPLE 7

250 grams of precoated woodflour having a silicate to woodflour ratio of 0.55:1, 50 grams of hollow glass microspheres having a diameter of from 5 to 5000 microns and wall thickness of from 0.5 to 10% of their diameters, 300 grams of vermiculite, 400 grams of the clay mixture described in Example 1, 400 ml. of water and 250 ml. of 25% 40° Bé. sodium silicate solution were mixed, formed and dried as in Example 1. Samples were fired at temperatures ranging from 850° C. to 1000° C. The fired articles had bulk densities of from 40–48 lbs./cu. ft. and flexural strength of from 160–220 p.s.i.

It is apparent that numerous modifications and variations may be effected without departing from the novel concepts of the present invention, and the illustrative details disclosed hereinabove are not to be construed as imposing undue limitations on the invention.

I claim:
1. A formable clay composition which comprises a formable clay mixture blended with from about 5% to about 70% by weight of a finely divided combustible organic filler, said filler being precoated with a soluble alkali metal silicate such that the silicate to organic filler weight ratio is from about 0.1:1 to about 5.5:1.

2. A composition according to claim 1 wherein the clay to silicate weight ratio is at least about 2.5:1.

3. A composition according to claim 2 wherein the clay to silicate weight ratio is from about 2.5:1 to about 25:1.

4. A composition according to claim 3 wherein the silicate is sodium silicate.

5. A composition according to claim 3 wherein the organic filler is woodflour.

6. In the process for preparing low density ceramic articles by adding a combustible, finely divided organic filler to a formable clay composition, forming the filled clay and firing at temperatures of from about 800° C. to about 1200° C., the improvement which comprises precoating the organic filler with a soluble alkali metal silicate by admixing the organic filler and silicate in a silicate to filler weight ratio of from about 0.1:1 to about 5.5:1, adding from about 4–15% by weight of the mixture of water to wet the filler, drying to remove the water and pulverizing the resultant mixture to a maximum particle size of 300 microns.

7. The process according to claim 6 wherein the silicate is sodium silicate and the organic filler is woodflour.

8. The process according to claim 7 wherein the clay to silicate weight ratio is from about 2.5:1 to about 25:1.

References Cited

UNITED STATES PATENTS

| 1,657,582 | 1/1928 | Odell | 106—41 |
| 1,925,985 | 9/1933 | Coss | 106—41 |
| 2,553,759 | 5/1951 | Geiger | 106—41 |
| 2,877,532 | 3/1959 | Heine | 106—41 X |
| 2,996,389 | 8/1961 | Fernhof | 106—41 |
| 3,150,989 | 9/1964 | Parsons | 106—40 |
| 3,256,105 | 6/1966 | Alford et al. | 106—40 |

HELEN M. McCARTHY, Primary Examiner

W. R. SATTERFIELD, Assistant Examiner

U.S. Cl. X.R.

252—378; 264—44, 59; 106—75